Figure 4:
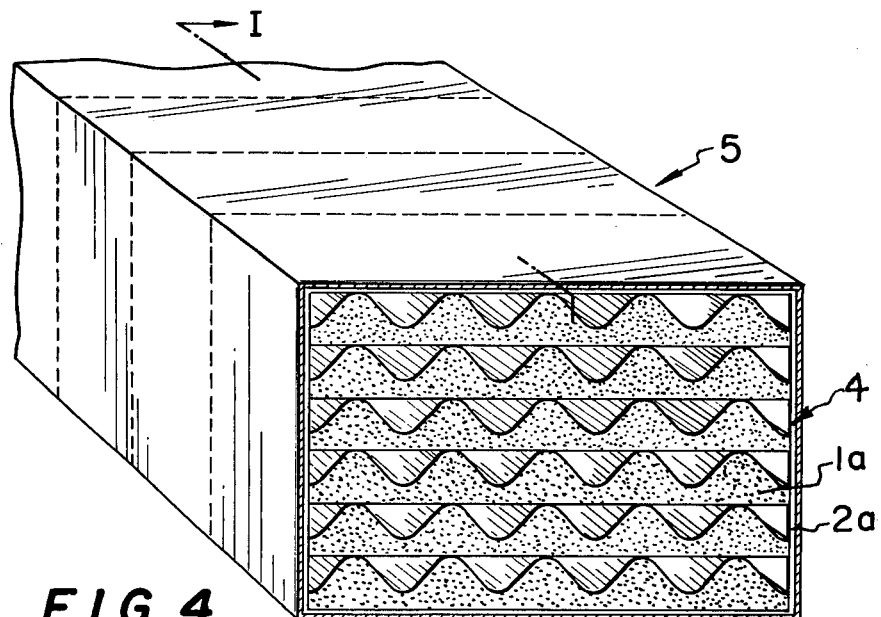

United States Patent [19]

Sakai et al.

[11] 4,028,275

[45] June 7, 1977

[54] PROCESS FOR PREPARING CATALYTIC MATERIALS FOR PURIFYING EXHAUST GAS AND CATALYTIC MATERIALS PREPARED THEREBY

[75] Inventors: Toshiyuki Sakai, Funabashi; Koichi Matsuo, Tachikawa; Yukihiro Tochio, Tokyo, all of Japan

[73] Assignee: Mitsui Mining & Smelting Co., Ltd., Japan

[22] Filed: Sept. 29, 1975

[21] Appl. No.: 617,396

Related U.S. Application Data

[63] Continuation-in-part of Ser. No. 432,909, Jan. 14, 1974, abandoned.

[30] Foreign Application Priority Data

Jan. 24, 1973 Japan .................................. 48-9553

[52] U.S. Cl. ..................... 252/466 PT; 252/429 R; 252/430; 252/441; 252/472; 252/477 R; 423/213.5
[51] Int. Cl.² .................. B01J 23/40; B01J 23/42; B01J 23/44
[58] Field of Search ..... 252/429 R, 477 R, 466 PT, 252/472, 428, 430, 441; 423/213.5

[56] References Cited

UNITED STATES PATENTS

| | | | |
|---|---|---|---|
| 2,408,164 | 9/1946 | Foster | 252/477 R X |
| 2,730,434 | 1/1956 | Houdry | 252/477 R X |
| 3,102,899 | 9/1963 | Cannell | 252/429 R X |
| 3,428,424 | 2/1969 | Keith | 252/477 R X |
| 3,487,112 | 12/1969 | Paulik et al. | 252/429 R X |
| 3,523,962 | 8/1970 | Ottmann et al. | 252/429 R X |
| 3,584,065 | 6/1971 | Oshima | 252/429 R X |
| 3,625,755 | 12/1971 | Potrafke | 252/429 R X |
| 3,632,620 | 1/1972 | Kober et al. | 252/429 R X |
| 3,739,005 | 6/1973 | McClure | 252/429 R X |
| 3,826,810 | 7/1974 | Lawson | 423/212 |

*Primary Examiner*—Patrick P. Garvin
*Attorney, Agent, or Firm*—Bucknam and Archer

[57] ABSTRACT

A catalyst for purifying exhaust gas may be prepared by a process comprising impregnating a ceramic carrier with an impregnating liquid containing at least one Platinum Group metal compound, at least one organic nitrogen compound and/or at least one organic phosphorus compound, drying the impregnated carrier, reducing the metal compound impregnated in the carrier to the corresponding metal and then calcining the metal on the carrier to obtain the desired catalyst. This invention also relates to the catalysts prepared by said process.

13 Claims, 10 Drawing Figures

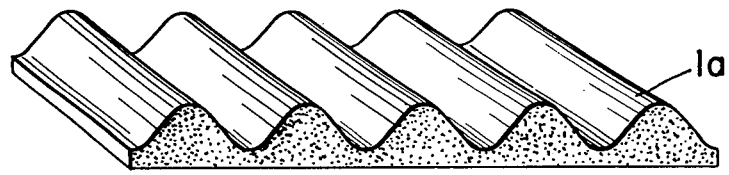
FIG. 1
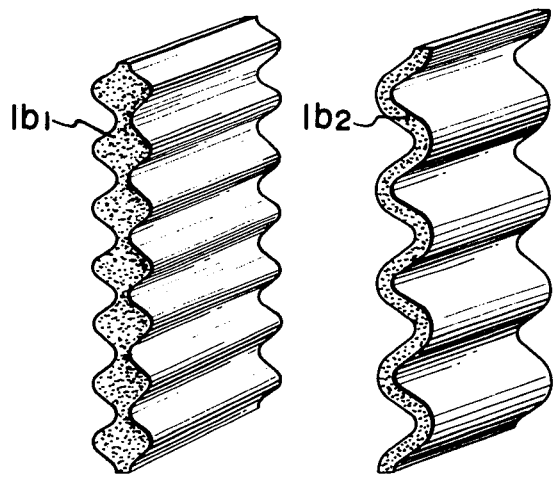
FIG. 2A  FIG. 2B
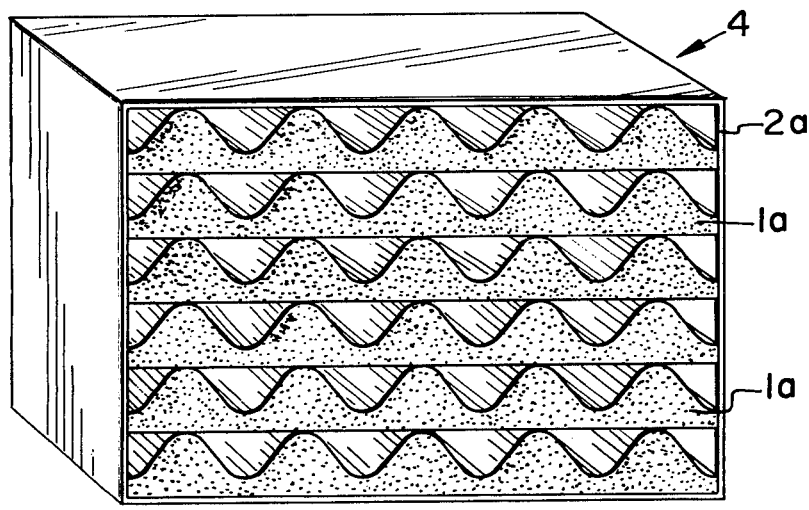
FIG. 3

U.S. Patent   June 7, 1977   Sheet 2 of 3   4,028,275

PROCESS FOR PREPARING CATALYTIC MATERIALS FOR PURIFYING EXHAUST GAS AND CATALYTIC MATERIALS PREPARED THEREBY

This application is a continuation-in-part of U.S. Ser. No. 432,909 filed Jan. 14, 1974, now abandoned.

This invention related to catalytic materials for converting combustion exhaust gas to harmless one. More particularly it relates to an impregnating liquid for use in the preparation of a catalyst excellently capable of converting harmful ingredients such as carbon monoxide and hydrocarbons, contained in combustion exhaust gas, to harmless ones such as carbonic acid gas and water, and it further relates to the catalyst so obtained and to a catalytic converter packed therewith.

As catalysts for effecting such conversion as above, there have heretofore been widely used so-called Platinum Group metal impregnated catalysts which are prepared by impregnating a natural or artificial ceramic material with an aqueous solution or impregnating solution containing a compound of the metals, such as platinum and palladium, of the platinum group of the Periodic Table and then treating the thus-impregnated ceramic material to reduce the metal compound impregnated therein to the elementary metal. The words "natural ceramic material" used herein are intended to mean asbestos, diatomaceous earth, pumice, zeolite and other naturally occurring materials having the same ingredients as artificial ceramics. Such conventional Platinum Group metal-containing catalysts are characterized by (1) excellent capability of oxidizing carbon monoxide, (2) a wide temperature range in which they are catalytically active, and (3) the advantage that they may be superior in heat resistance and mechanical strength if they contain the heat-resistant and mechanically strong carrier which is obtainable by molding alumina under pressure and calcining the thus-molded alumina. Thus they have many times been tried to be used for converting automobile exhaust gas to harmless one. However, such catalysts are defective in that (1) they are insufficiently capable of oxidizing hydrocarbons and (2) they rapidly lose their catalytic activity because of being easily poisoned by lead if exhaust gas to be purified contains the lead. Thus, they should urgently be improved to eliminate said defects therefrom if they are attempted to be used as catalysts for purifying exhaust gas particularly from internal combustion engines using leaded gasoline.

An object of this invention is to provide an impregnating liquid for use in the preparation of Platinum Group metal-containing catalysts for purifying combustion exhaust gas which eliminate the above-mentioned defects of the conventional catalysts or are superior in (1) capability of oxidizing hydrocarbons and (2) resistance to the poisoning of lead.

Another object is to provide an impregnation type catalyst prepared by impregnating a carrier with the impregnating liquid, the catalyst being preferably in the form of an integral shape-retaining catalyst element prepared by the impregnation of a specifically molded carrier with the impregnating liquid.

Still another object is to provide a catalytic converter for purifying combustion exhaust gas, comprising a converter case packed with at least one catalyst pack containing integral shape-retaining molded catalyst elements.

The impregnating liquid of this invention is characterized in that it comprises a conventional, Platinum Group metal-containing impregnating liquid (hereinafter referred to as "base impregnating liquid") which is incorporated essentially with at least one member selected from the group consisting of organic nitrogen compounds and organic phosphorus compounds and is incorporated preferably with at least one member selected from the group consisting of aliphatic saturated dicarboxylic acids and aliphatic oxycarboxylic acids. The base impregnating liquid usually contains at least one Platinum Group metal in the ionic form in amounts of from 0.1–60 g/l usually at a pH value of up to 3. In some cases, it may be incorporated with a buffer solution or ammonia water and used at a pH value of higher than 3.

The Platinum Group metal compounds which may be used include platinous chloride ($PtCl_2$), platinic chloride ($PtCl_4$), chloroplatinous acid ($H_2PtCl_4$), chloroplatinic acid ($H_2PtCl_6 \cdot 6H_2O$), platinous potassium chloride ($K_2PtCl_4$), platinic potassium chloride ($K_2PtCl_6$), palladium chloride ($PdCl_2$), palladium nitrate ($Pd(NO_3)_2$), palladium acetate (($CH_3COO)_2Pd$) and palladium sulfate ($PdSO_4 \cdot 2H_2O$).

The organic nitrogen compounds which may be used in the practice of this invention, include those containing at least one of amino group ($-NH_2$) and nitrogen atom (N) which is bonded to the adjacent atom by a multiple bond in such forms as $-N=N-$, $>C=N-$, $-C\equiv N$ and $-N=O$; and the organic phosphorus compounds used herein include those containing trivalent phosphorus (P) such as $R_3P$, $(RO)_3P$ and $(RO)_2POH$ wherein R is alkyl. Examples of the organic nitrogen compounds are azodicarbonamide, cyanuric acid azobisisobutyronitrile, guanidine and melamine and examples of the organic phosphorus compounds are trimethyl phosphite, triethyl phosphite and diethyl phosphite. These essential organic nitrogen and phosphorus compounds may be used singly or jointly, but they are usually used singly since the joint use will not bring about any advantage resulting only in the operation being complicated.

The aliphatic saturated dicarboxylic acids include oxalic and succinic acids, and the aliphatic oxycarboxylic acids include tartaric, citric and gluconic acids.

The effective amounts of these essential organic nitrogen and/or phosphorus compounds added to the base impregnating liquid may vary from ½ to 6 mols per mol of the metal of the Platinum Group contained in the base liquid. The most effective amounts are in the range of from 2 to 3 mols and these amounts should thus be used unless otherwise indicated. The aliphatic saturated dicarboxylic acids and aliphatic oxycarboxylic acids (these dicarboxylic and oxycarboxylic acids being hereinafter referred to as "optional organic compounds") may preferably be incorporated in the base impregnating liquid. The optional organic compounds when added to the base impregnating liquid, will retard the precipitation of the hydroxide of the platinum group metal in the liquid to facilitate the deposition of the metal on the carrier thereby rendering it possible to obtain a catalyst having further improved converting capability and resistance to poisoning.

The amounts of the optional organic compounds added to the base impregnating liquid are not particularly limited; however, they may preferably be added in the amounts of 1–5% by weight of the resulting impregnating liquid according to this invention. The organic compounds, whether essential or optional, to be added to the base liquid may be in a liquid or powdery state. The base liquid begins to discolor on addition of the essential organic compound thereto and, after a while, ends to discolor. When the base impregnating liquid is incorporated with at least one of the essential organic compounds together with or without at least one of the optional organic compounds thereby to cause its discoloration and is then confirmed to have ended the discoloration, said organic compound-incorporated liquid forms an impregnating liquid according to this invention. To allow the discoloration to end rapidly, a thorough agitation or mixing of the organic compound-added base liquid is recommendable. However, in cases where the discoloration proceeds less rapidly than desired, it can be accelerated by slightly heating the liquid. It usually takes about 5–10 minutes to complete the discoloration. The impregnation type catalysts of this invention are prepared in the same manner as the conventional ones except that the organic compound-containing impregnating liquid is used as the impregnant. More particularly, the catalysts of this invention are prepared by a process comprising the steps of impregnating a heat-resistant ceramic material as the carrier for the catalyst with an impregnating liquid consisting essentially of an aqueous solution containing (A) preferably 0.1–60 g/l calculated as the metal ion of at least one Platinum Group metal compound selected from the group consisting of platinous chloride, platinic chloride, chloroplatinous acid, chloroplatinic acid, platinous potassium chloride, platinic potassium chloride, palladium chloride, palladium nitrate, palladium acetate and palladium sulfate and (B) at least one organic compound selected from the group consisting of (1) organic nitrogen compounds which are azodicarbonamide, cyanuric acid, azobisisobutyronitrile, guanidine and melamine and (2) organic phosphorus compounds which are trimethyl phosphite, triethyl phosphite and diethyl phosphite, said at least one organic compound (B) being in an amount of preferably 0.5–6 mols per mol of the Platinum Group metal, drying the thus-impregnated carrier, reducing the impregnated carrier so dried with a reducing agent to reduce the Platinum Group metal compound (A) impregnated to the corresponding metal and calcining the thus-obtained metal on the carrier at a temperature not lower than the temperature at which said at least one organic compound (B) is thermally decomposed, for a time enough to burn off said organic compound (B). Said calcining may be effected at temperatures of preferably 500°–900° C for preferably 1–5 hours. Said reducing may be effected in a reducing gas such as hydrogen at temperatures of preferably 150°–500° C for preferably 15–60 minutes; it may alternatively be effected in a 2–20% reducing aqueous solution of formaldehyde, formic acid, sodium formate, hydrazin, sodium boron hydride or the like, at 30°–95° C for 10–60 minutes, preferably at 60°–80° C for 15–30 minutes. The Platinum Group metal-containing catalysts prepared using the impregnating liquid of this invention, as compared with the conventional ones, are excellent in capability of oxidizing not only hydrocarbons but carbon monoxide and in resistance to lead poisoning although the reason for their excellency is not theoretically clarified yet.

Catalysts for converting automobile exhaust gas to harmless one, are required to meet serious conditions illustrated below:

1. The catalyst should not cause the flow resistance of exhaust gas to be increased due to the fitting thereof in the path of the gas.

2. The catalyst should not be destroyed and lost due to collision and friction between the catalyst elements themselves and between said catalyst elements and the walls of a container in which they are packed.

In view of these requirements, various studies were made in an attempt to find what molded shape and pack structure the catalyst should have. As a result of the studies, it has been found particularly advantageous to use the catalyst in the form of a catalytic converter which comprises a converter case charged with at least one catalyst pack comprising a catalyst container packed with a plurality of integral shape-retaining catalyst elements juxtaposed or stacked one upon another. In some cases, the catalyst elements may be charged in bulk in the converter case.

In an embodiment of catalytic converter of this invention, the converter may be prepared by molding a carrier material into sheets having undulations, such as corrugations, on at least one surface thereof, impregnating the thus-obtained sheets with the impregnating liquid according to this invention to produce corrugated sheet-like catalyst elements which are integral shape-retaining molded catalyst elements, charging the molded catalyst elements snugly in a catalyst container to form a pack thereof and then placing one or more of the catalyst packs so formed in a converter case so that they are snugly housed therein using packings or pads if necessary.

In another embodiment of catalytic converter of this invention, the catalytic converter may be prepared by molding a carrier material into doughnut-shaped masses being of hollow shape and having undulations (or serrations) on at least one peripheral surface thereof, impregnating the serrated doughnut-shaped masses with the impregnating liquid according to this invention to produce doughnut-shaped catalyst elements while likewise producing otherwise-sized doughnut-shaped catalyst elements, the thus-produced catalyst elements being of graduated size and being capable of being arranged one within another in concentric snug relationship with their peripheral surfaces being substantially in contact with each other, arranging the catalyst elements of graduated size one within another snugly in a catalyst container thereby to form a concentrically arranged catalyst pack, and then charging one or more of the thus-formed catalyst packs in a converter case so as to define a multitude of axially extending passages through which the exhaust gas can flow and to be snugly housed in the converter case using packings or pads if necessary.

In the preparation of a catalyst pack by stacking the corrugated sheet-like catalyst elements one upon another or arranging the serrated doughnut-like catalyst elements in graduated size one within another, a flat or cylindrical wire net having a suitable mesh size (for example, a 6–20 mesh size) and being made of a heat-resistant steel, may be interposed between the sheet-like or doughnut-like catalyst elements thereby making it possible to further alleviate possible vibration of the catalyst elements when the catalyst pack is put to use for purifying exhaust gas particularly from automobile engines.

The catalyst containers referred to in this specification are of cylindrical or tubular shape having a circular, square or any other desired cross section.

Figure 5:
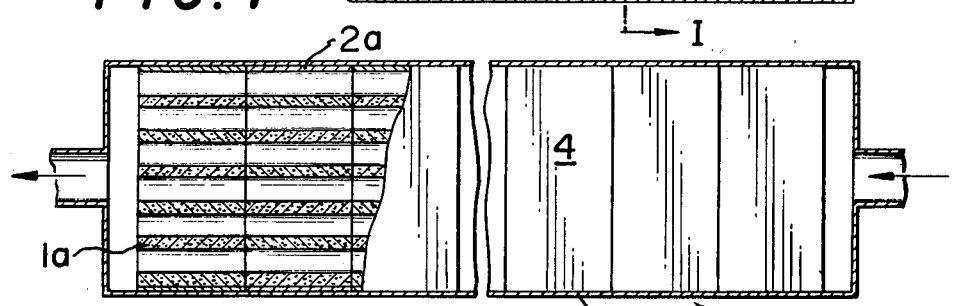
Figure 6:
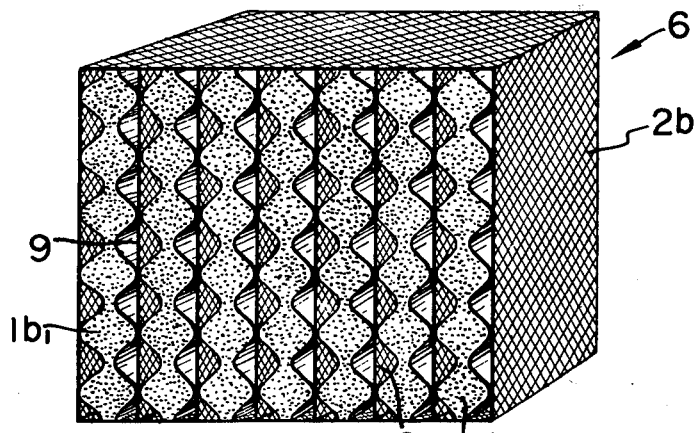
Figure 7:
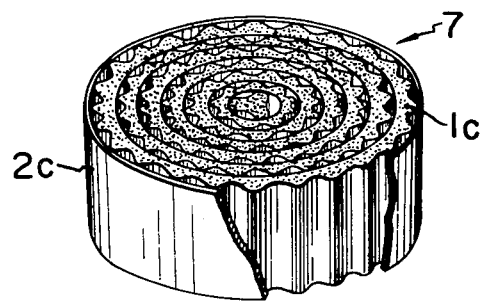
Figure 8:
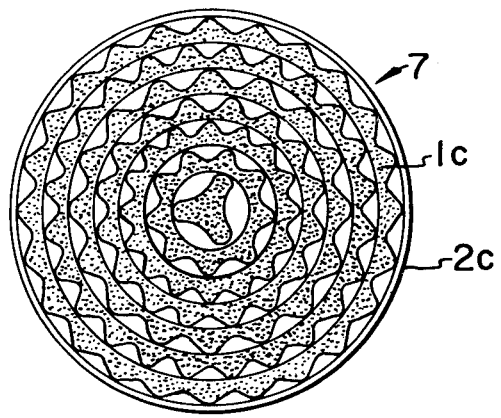
Figure 9:
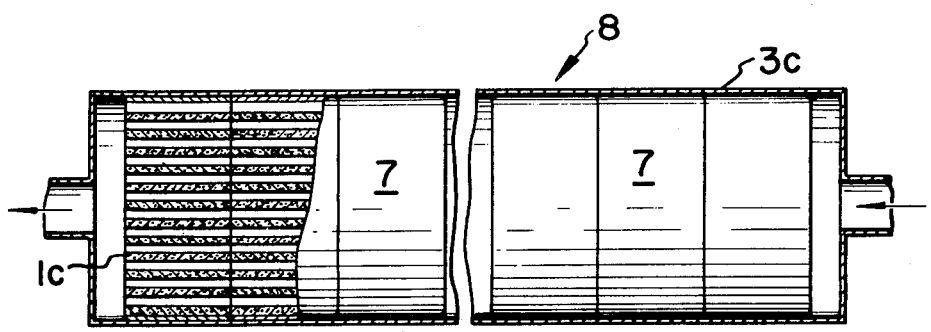

FIG. 1 is a perspective view of an embodiment of a molded catalyst element being substantially planar or sheet-like and having undulations on one surface thereof, FIGS. 2A and 2B are perspective views of other embodiments of a molded catalyst element being substantially sheet-like and having undulations on both surfaces thereof, respectively, FIG. 3 is a perspective view illustrating a catalyst pack comprising a catalyst container packed with a plurality of catalyst elements of FIG. 1, FIG. 4 is a perspective view illustrating a catalytic converter, in part, comprising a converter case in which a plurality of catalyst packs of FIG. 3 are snugly housed, the case in this Figure being freed from end plates having a gas passage, FIG. 5 shows a longitudinal section of the catalyst converter of FIG. 4 taken on lines I—I of FIG. 4 and also shows catalyst packs housed in the converter case fitted at the ends with the end plates having the gas passage, FIG. 6 is a perspective view illustrating a catalyst pack comprising a wire net-made container packed with a plurality of catalyst elements of FIG. 2, with a wire net inserted between the neighboring catalyst elements, FIG. 7 is a perspective view illustrating a catalyst pack, partly exploded, comprising a catalyst container packed with a plurality of doughnut-like molded catalyst elements being of graduated size and being arranged one within another, FIG. 8 is a plan view of the catalyst pack of FIG. 7, FIG. 9 illustrates a longitudinal section of a catalytic converter comprising a converter case packed with at least one catalyst pack of FIG. 7 and also illustrates catalyst packs of FIG. 7 housed in the converter case.

Referring particularly to FIGS. 1 and 3, a plurality of the catalyst elements $1a$ are snugly housed in stacked relation with their undulated surfaces upward in a square tube $2a$ to define a multitude of passages between said catalyst elements, thereby forming a catalyst pack 4. One or more of the catalyst packs 4 are snugly charged in a converter case $3a$ thereby to form a catalytic converter 5 for purifying or converting the exhaust gas as shown in FIGS. 4 and 5. In FIG. 6, a plurality of the catalyst elements $1b_1$ of FIG. 2A are snugly housed side by side with a heat-resistant wire net 9 inserted between the neighbouring elements in a square tube $2b$ made of wire net thereby to form a catalyst pack 6, and the wire nets 9 are preferably coextensive with the surface of the elements $1b_1$. The catalyst elements $1b_2$ of FIG. 2B may be treated in the same manner as those $1b_1$ of FIG. 2A to form a catalyst pack thereof.

With reference to FIGS. 7 and 8, a plurality of the doughnut-like molded catalyst elements $1c$ being of graduated size and having undulations on the outer peripheral surface, are arranged in a cylindrical tube 2C one within another in concentric snug relationship with their peripheral surfaces being substantially in contact with each other to define a multitude of axially extending passages through which exhaust gas can flow, thereby forming a circular catalyst pack 7. One or more of the packs 7 are snugly housed in a converter case 3C thereby to form a catalyst converter 8 for purifying or converting the exhaust gas as shown in FIG. 9.

The catalytic converters containing the catalyst packs in such arrangements as mentioned above are advantageous in that:

1. They allow exhaust gas from engines to flow smoothly and uniformly through every gas passage between the catalyst elements thereof,
2. They do not cause a substantial increase in resistance to exhaust gas flow nor a substantial decrease in engine efficiency,
3. They do not allow the catalyst elements and packs contained therein to be displaced with respect to each other, destroyed and worn when subjected to vibration,
4. They do not cause such self-destruction as is possibly caused in integral ceramic articles, such as ceramic honeycomb structures, due to the non-uniformity in thermal expansion of every part thereof, since they are not integrally made but are each an assembly of the catalyst elements,
5. They can be obtained as those having a desired total cross-sectional area of the gas passage therein,
6. They can be so fabricated that they are adapted for additional use as a silencer if desired, and
7. The catalyst elements which a catalyst pack is to be composed of, may be obtained in a predetermined constant shape and they can be therefore suited for their mass production, easily handled and easily assembled into a catalyst pack.

The carrier materials for the catalyst may be selected from various suitable materials and molded into an integral shape-retaining molded carrier for the catalyst element by any one of various suitable molding methods; however, heat-resistant ceramic materials are usually used as the carrier material with alumina being preferred, and compression molding methods are usually employed as the molding method. The carrier according to this invention may be prepared by charging a powdery material consisting substantially of powdered alumina in a mold having a desired shape, compacting the thus-charged powder under a gauge pressure of 1–5 ton/cm$^2$, preferably 2–3 ton/cm$^2$, to obtain a molding thereof, drying the thus-obtained molding and then baking the dried molding usually at 500°–1000° C for 10–20 hours thereby to produce the desired carrier. The carrier so produced is capable of being easily impregnated, superior in mechanical strength and desirable in shape.

This invention will be better understood by the following Examples.

Prior to mentioning the Examples, there will be described a conventional basic process for the preparation of a catalyst for purifying exhaust gas in the following Comparison example.

COMPARATIVE EXAMPLE

Powdered alumina, which is commercially available, was incorporated with water in the amount of approximately 10% by weight of the alumina. The water-added alumina was charged in a metallic mold, compacting the charged alumina under a gauge pressure of 2.5 ton/cm$^2$ to obtain corrugated sheet-like moldings having a size of 60 mm × 30 mm × 2.3 mm, which moldings were dried at 80°–100° C for a full day and then baked at 700° C for 3 hours to obtain alumina carriers having substantially the same size and shape as above. These alumina carriers were impregnated with an aqueous solution of PdCl$_2$ or H$_2$PtCl$_6$·6H$_2$O, the solution being acidified with hydrochloric acid, thereafter dried at 130°–150° C for a full day, reduced in a hydrogen stream at 200° C for 30 minutes and then calcined or baked at 700° C for 3 hours thereby to produce impregnation-type, corrugated sheet-like molded catalyst elements as shown in FIG. 2B. The thus-produced catalyst elements (1.2 kg) were arranged in catalyst containers to form catalyst packs in the same manner as shown in FIG. 3 and the packs were then charged in a converter case in the same manner as shown in FIG. 5, thereby obtaining a catalytic converter. The catalytic converters so obtained were used at 850° C for 100 hours to purify exhaust gas from an engine of 1600 c.c. displacement using leaded gasoline as the fuel in order to make a test for their initial and final catalytic activities or converting capabilities for carbon monoxide (CO) and hydrocarbons (HC). The results are shown in Table 1.

lutions of $PdCl_2$, the solutions each containing $PdCl_2$ as Pd in the amount of 0.5% by weight of the alumina carrier used. These four solutions were incorporated and thoroughly mixed with azodicarbonamide in the amounts of 1, 2, 3 and 4 mols per mol of Pd contained therein, respectively. The solutions so obtained were each impregnated in the same molded alumina carriers as those in the Comparison example to form impregnated molded carriers which were dried in a dryer at 130°–150° C for a full day, kept in a hydrogen stream at 200° C for 30 minutes to reduce the $PdCl_2$ impregnated and then calcined at 700° C for 3 hours to obtain corrugated sheet-like molded catalyst elements. The four kinds of catalyst elements so obtained were used in the preparation of four kinds of catalytic converters.

These catalytic converters were tested in the same

Table 1

| | | Converting Capability of Catalyst Prepared Without The Use of Organic Additives | | | |
|---|---|---|---|---|---|
| | | Conversion ratio for carbon monoxide (%) | | Conversion ratio for hydrocarbons (%) | |
| Kind of Catalyst | Space Velocity $(hr^{-1})$ | Initial (0 hr) | Final (After use at 850° C for 100 hrs) | Initial (0 hr) | Final (After use at 850° C for 100 hrs) |
| Pd-impregnated catalyst | 12,000 | 96 | 81 | 62 | 46 |
| | 24,000 | 91 | 75 | 50 | 38 |
| Pt-impregnated catalyst | 12,000 | 97 | 82 | 68 | 49 |
| | 24,000 | 93 | 77 | 55 | 40 |

In this Comparison example and the following Examples, there was used an exhaust gas having the following composition:
CO: 2.0–2.2%
HC: 450–550 ppm
$O_2$: 4.5–5.0%

The gas analyses were effected using NDIR, the conversion ratios for hydrocarbons calculated in terms of n-hexane and the initial conversion ratios (0 hr) as measured when the catalyst was raised in temperature to 450° C.

In Examples 1–5 the same procedure as in the Comparison example was followed except that the organic additive according to this invention was used, and the same test as in the Comparison example was made.

EXAMPLE 1

The procedure of the Comparison example was followed except that the organic additive according to this invention was used and the test was made in the same manner as in the Comparison example. There were prepared four hydrochloric acid-acidified aqueous somanner as in the Comparison example with the results being shown in Table 2. From the Table it is seen that all the catalytic converters exhibited satisfactory catalytic activity or performance and, among other, the catalytic converters Nos. 2 and 3 were more satisfactory as such.

Table 2

| | | | Relationship Between Catalytic Activity And Amount Of Azodicarbonamide Added | | | |
|---|---|---|---|---|---|---|
| | | | Conversion ratio for carbon monoxide (%) | | Conversion ratio for hydrocarbons (%) | |
| Catalytic converter No. | Molar ratio between azodicarbonamide added and Pd used | Final Space velocity $(hr^{-1})$ | Initial (0 hr) | Final (After use at 850° C for 100 hrs) | Initial (0 hr) | (After use at 850° C for 100 hrs) |
| 1 | 1 : 1 | 12,000 | 97 | 93 | 86 | 79 |
| | | 24,000 | 93 | 90 | 81 | 68 |
| 2 | 2 : 1 | 12,000 | 99 | 95 | 93 | 84 |
| | | 24,000 | 98 | 93 | 90 | 78 |
| 3 | 3 : 1 | 12,000 | 99 | 95 | 92 | 84 |
| | | 24,000 | 97 | 92 | 88 | 77 |
| 4 | 4 : 1 | 12,000 | 97 | 93 | 87 | 80 |
| | | 24,000 | 95 | 90 | 84 | 72 |

EXAMPLE 2

The procedure of Example 1 was followed except that the $PdCl_2$ and azodicarbonamide were substituted by $H_2PtCl_6·6H_2O$ and 2 mol of guanidine per mol of Pt, respectively. The catalytic converters obtained were tested for catalytic activity at the initial and final stages of use thereof. The results are shown in the No. 1 row of Table 3.

EXAMPLE 3

The procedure of Example 1 was followed except that the azodicarbonamide was replaced by 3 mol of melamine as the organic additive per mol of Pd. The catalytic converters obtained were tested and found to have catalytic activity as indicated in No. 2 row of Table 3.

EXAMPLE 4

The procedure of Example 1 was followed except that the azodicarbonamide was substituted by 2 mol of trimethyl phosphite per mol of Pd, to obtain catalytic converters which were tested for catalytic activity with the result as shown in No. 3 row of Table 3.

EXAMPLE 5

The procedure of Example 1 was repeated except that the $PdCl_2$ and azodicarbonamide were substituted by $H_2PtCl_6 \cdot 6H_2O$ and 3 mol of diethyl phosphite per mol of Pd, respectively. The catalytic converters obtained were tested and found to have catalytic activity as indicated in No. 4 row of Table 3.

Table 4

| Organic acid used as additive | Amount of acid used (wt.%) | Time in which precipitation was effected (min.) |
| --- | --- | --- |
| None | — | 0.5 |
| Citric acid | 1 | 4 – 5 |
|  | 2 | 25 – 30 |
|  | 5 | 90 – 100 |
| Tartaric acid | 1 | 4 – 5 |
|  | 2 | 12 – 15 |
|  | 5 | 25 – 30 |
| Gluconic acid | 1 | 4 – 5 |
|  | 2 | 12 – 15 |
|  | 5 | 25 – 30 |
| Oxalic acid | 1 | 4 – 5 |
|  | 2 | 8 – 10 |
|  | 5 | 15 – 20 |
| Succinic acid | 1 | 4 – 5 |
|  | 2 | 8 – 10 |
|  | 5 | 15 – 20 |

Table 3

Catalytic Activity Of Catalyst Obtained By Process Of This Invention

| | | | Conversion ratio for carbon monoxide (%) | | Conversion ratio for hydrocarbons (%) | |
| --- | --- | --- | --- | --- | --- | --- |
| Row No. | Organic additive | Space velocity ($hr^{-1}$) | Initial (0 hr) | Final (After use at 850° C for 100 hrs) | Initial (0 hr) | Final (After use at 850° C for 100 hrs) |
| 1 | Guanidine | 12,000 | 99 | 93 | 92 | 82 |
|  |  | 24,000 | 96 | 91 | 88 | 73 |
| 2 | Melamine | 12,000 | 99 | 96 | 93 | 85 |
|  |  | 24,000 | 97 | 92 | 91 | 79 |
| 3 | Trimethyl phosphite | 12,000 | 99 | 93 | 90 | 81 |
|  |  | 24,000 | 97 | 90 | 87 | 72 |
| 4 | Diethyl phosphite | 12,000 | 99 | 92 | 90 | 80 |
|  |  | 24,000 | 96 | 89 | 86 | 71 |

EXAMPLE 6

One hundred grams of alumina pellets having a 5-mm diameter as the carrier were impregnated with each of 100-ml impregnating liquids of this invention comprising 15 g/l of palladium chloride, 40 g/l of azodicarbonamide, 40 g/l of acetic acid and, as the additive, one of the organic acids as indicated in Table 4, to see a time taken to start to cause precipitation of palladium hydroxide produced. For comparison, the same procedure as above was followed, but using a conventional impregnating liquid comprising 15 g/l of palladium chloride, 40 g/l of azodicarbonamide and 40 g/l of acetic acid. The results are shown in Table 4, from which it is seen that the use of the organic acids as the additive had a remarkably favorable effect. More particularly, the use of the conventional impregnating liquid containing none of such additives started to cause the precipitation of the palladium hydroxide in only 30 seconds thus requiring skill in rapid treatment of impregnation since, otherwise, the catalyst component would not have deposited uniformly on every part of the surface of the carrier component thereby making it difficult to obtain a uniform quality on catalysts produced. On the other hand, the use of each of the impregnating liquids containing one of the organic acid additives according to this invention started to cause the precipitation of the palladium hydroxide in more than 4–5 minutes during which satisfactory impregnation was easily effected without requiring such skill as above.

EXAMPLES 7–9

The procedure of Example 1 was followed except that the $PdCl_2$ was substituted by each of $Pd(NO_3)_2$, $(CH_3COO)_2Pd$ and $PdSO_4 \cdot 2H_2O$. The thus-obtained catalytic converters exhibited approximately the same activity as those in the other Examples.

EXAMPLES 10–14

The procedure of Example 2 was followed except that the $H_2PtCl_6 \cdot 6H_2O$ was substituted by each of $PtCl_2$, $PtCl_4$, $H_2PtCl_4$, $K_2PtCl_4$ and $K_2PtCl_6$. The catalytic converters exhibited about the same catalytic activity as those in the other Examples.

What is claimed is:

1. A process for preparing a catalyst for purifying exhaust gas comprising the steps of:
    impregnating a heat-resistant ceramic material as the carrier for the catalyst with an impregnating liquid consisting essentially of an aqueous solution containing (A) 0.1–60 g/l calculated as the metal ion of at least one Platinum Group metal compound selected from the group consisting of platinous chloride, platinic chloride, chloroplatinous acid, chloroplatinic acid, platinous potassium chloride, platinic potassium chloride, palladium chloride, palladium nitrate, palladium acetate and palladium sulfate and (B) at least one organic compound selected from the group consisting of (1) organic nitrogen compounds which are azodicarbonamide, cyanuric acid, azobisisobutyronitrile, guanidine and melamine and (2) organic phosphorus compounds which are trimethyl phosphite, triethyl phosphite and diethyl phosphite, said at least one organic compound (B) being in an amount of 0.5–6 mols per mol of the Platinum Group metal, drying the thus-impregnated carrier, keeping the thus-dried impregnated carrier in a reducing gas stream at an elevated temperature to reduce the Platinum Group metal compound (A) impregnated in the carrier, and calcining the thus-reduced impregnated carrier at a temperature not lower than the temperature at which said at least one organic compound (B) is thermally decomposed, for a time enough to burn off the organic compound (B) impregnated in the carrier thereby obtaining the desired catalyst.

2. A process according to claim 1, wherein said at least one organic compound (B) is contained in an amount of 2–3 mols per mol of the Platinum Group metal.

3. A process according to claim 1, wherein said impregnating liquid additionally contains at least one organic carboxylic acid selected from the group consisting of oxalic, succinic, tartaric, citric and gluconic acids in an amount of 1–5% by weight of the impregnating liquid.

4. A process according to claim 1, wherein the calcining is effected at 500°–900° C for 1–5 hours.

5. A process according to claim 1, wherein the impregnating liquid has a pH of up to 3.

6. A catalyst prepared by the process of claim 1.

7. A catalyst prepared by the process of claim 3.

8. A catalyst according to claim 6, wherein the heat-resistant carrier consists substantially of alumina.

9. A catalyst according to claim 7, wherein the heat-resistant carrier consists substantially of alumina.

10. A catalyst element according to claim 6, wherein the carrier is molded into a sheet with undulations on at least one surface thereof.

11. A catalyst element according to claim 7, wherein the carrier is molded into a sheet with undulations on at least one surface thereof.

12. A catalyst element according to claim 6, wherein the carrier is molded into a doughnut-like mass with undulations on at least one peripheral surface thereof.

13. A catalyst element according to claim 7, wherein the carrier is molded into a doughnut-like mass with undulations on at least one peripheral surface thereof.

* * * * *